US006589417B2

(12) United States Patent
Taciuk et al.

(10) Patent No.: US 6,589,417 B2
(45) Date of Patent: Jul. 8, 2003

(54) THERMAL APPARATUS AND PROCESS FOR REMOVING CONTAMINANTS FROM OIL

(75) Inventors: William Taciuk, Calgary (CA); Steve Odut, Calgary (CA); Gordon Taciuk, Calgary (CA); Charlie Wheeler, Calgary (CA)

(73) Assignee: Alberta Oil Sands Tech and Research Authority, Edmonton (CA)

( * ) Notice: Subject to any disclaimer, the term of this patent is extended or adjusted under 35 U.S.C. 154(b) by 21 days.

(21) Appl. No.: 09/861,673

(22) Filed: May 22, 2001

(65) Prior Publication Data

US 2002/0029996 A1 Mar. 14, 2002

Related U.S. Application Data

(60) Continuation of application No. 09/572,591, filed on May 17, 2000, now abandoned, which is a division of application No. 08/956,441, filed on Oct. 23, 1997, now Pat. No. 6,203,765, which is a division of application No. 08/727,345, filed on Oct. 7, 1996, now abandoned.

(30) Foreign Application Priority Data

Sep. 27, 1996 (CA) .............................................. 2186658

(51) Int. Cl.$^7$ ........................ C10M 175/00; C10G 29/04
(52) U.S. Cl. ........................ 208/179; 208/182; 208/187; 208/251 R; 208/253; 208/255
(58) Field of Search .................. 208/179, 182, 208/187, 251 R, 253, 255

(56) References Cited

U.S. PATENT DOCUMENTS

| 4,439,209 A | * | 3/1984 | Wilwerding et al. ............ 48/76 |
| 5,656,044 A | * | 8/1997 | Bishop et al. ............ 48/197 R |
| 5,851,246 A | * | 12/1998 | Bishop et al. ................ 48/122 |
| 5,914,027 A | * | 6/1999 | Ellingsen .................... 208/126 |
| 6,203,765 B1 | * | 3/2001 | Taciuk et al. ................ 422/210 |

* cited by examiner

*Primary Examiner*—Walter D. Griffin
*Assistant Examiner*—Tam M. Nguyen
(74) *Attorney, Agent, or Firm*—Millen, White, Zelano & Branigan, P.C.

(57) ABSTRACT

Used oil is treated in a reactor to remove contaminants. The reactor comprises a rotating vessel housed within a heating chamber. The inside of the vessel is indirectly heated by conduction through the vessel walls. The vessel contains a permanently resident charge of non-ablating, coarse granular solids. Within the vessel, the oil is vaporized and pyrolyzed, producing a hydrocarbon vapor. Coke is formed as a byproduct. Contaminants, such as metals and halides become associated with the coke. The coarse granular solids scour and comminute the coke to form fine solids. The fine solids are separated from the coarse solids and are removed from the vessel. The hydrocarbon vapors are separated from any fine solids and are routed to a vapor condensation system for producing a substantially contaminant-free product oil. The contaminant-rich solids are collected for disposal.

11 Claims, 4 Drawing Sheets

THERMAL APPARATUS AND PROCESS FOR REMOVING CONTAMINANTS FROM OIL

This application is a continuation-in-part of application Ser. No. 09/572,951 filed on May 17, 2000 (now abandoned), which is a division of application Ser. No. 08/956,441 filed on Oct. 23, 1997 (now U.S. Pat. No. 6,203,765), which is a divisional application of parent application Ser. No. 08/727,345 filed on Oct. 7, 1996 (now abandoned).

FIELD OF THE INVENTION

The invention relates to a process for removing contaminants from used oil by subjecting the oil to vaporization and pyrolysis, whereby coke is formed. The contaminants remain with the coke, which can be separated from the oil. The invention further relates to a rotating, indirectly heated retort or reactor in which the process is practised.

BACKGROUND OF THE INVENTION

Processes are known for reclaiming oil from contaminated used oil (sometimes referred to as waste oil).

One such process is disclosed in U.S. Pat. No. 5,271,808, issued Dec. 21, 1993 to Shurtleff. Shurtleff discloses a process wherein an inclined boiler heats the waste oil, vaporizing and driving off lighter hydrocarbons at temperatures of about 650° F. Heavier hydrocarbons and contaminants, amounting to about 10% of the original oil, collect as a sludge in the bottom of the boiler. The sludge drains for disposal. The lighter hydrocarbons are condensed as a reclaimed oil product.

However, Shurtleff's process produces an oily waste which itself requires specialized disposal.

Other methods which can produce a reclaimed oil and an oil-dry contaminant typically involve subjecting the waste oil to thermal pyrolysis.

For example, in U.S. Pat. No. 5,423,891, issued to Taylor, a process is disclosed for the gasification of solids waste. Heat carrier solids (HCS) are first heated and then fed co-currently with hydrocarbon-bearing solids waste through a rotary kiln retort. The solids waste and HCS co-mingle, transferring heat. The resulting temperatures of 1200 to 1500° F. are suitable to thermally pyrolyse the hydrocarbons in the waste. The resultant vapours are extracted for condensation. The retort solids and HCS are discharged from the kiln for recovery of the retort solids and re-heating of the HCS.

In Taylor's system the HCS are continuously circulated in a material handling loop. The HCS is a coarse granular solid which is heated outside the kiln and gives up its heat inside the kiln. Transport of the HCS around the loop involves considerable materials-handling equipment.

In U.S. Pat. No. 4,473,464, issued to Boyer et al., a process is disclosed for treating heavy crude oil. Carbonaceous solids are finely ground for concurrent feed with crude oil to an indirectly heated kiln. Pyrolysed hydrocarbon vapours are condensed. Coke and carbonaceous solids are screened, ground and recycled outside the kiln. Heat loss to the solids is minimized and the crude oil is preheated to a temperature high enough to balance any temperature loss by the solids.

U.S. Pat. No. 4,303,477, issued to Schmidt et al., discloses co-currently adding a consumable fine-grained reactive solid to a waste material for binding metal and sulfur contaminants during treatment. The reactive solids, such as lime having a grain size typically less than 1 mm, and waste are thermally cracked as they progress through a rotating, indirectly fired kiln. The solids make a single pass through the kiln, the reactive solid being consumed in the process.

Some of the above described prior art processes involve significant material handling challenges in the recycling and conveyancing of large masses of hot, coarse solids. Other processes, which do not recycle hot solids, involve rejection of a portion of the oily waste or irreversibly consume a catalyst.

There is therefore a need for a simplified process for separating contaminants from used oils. It is the objective of the present invention to provide such a process.

SUMMARY OF THE INVENTION

The present invention provides a simple apparatus and process for reclaiming oil from used, contaminated oil feed. In general, the process comprises feeding used oil through a feed line to a rotating thermal reactor wherein the oil is pyrolysed to produce hydrocarbon vapour and coke. The contaminants become associated with the coke. The vapour and coked solids are removed from the reactor. The vapour is condensed to produce a contaminant-free oil product and the contaminant-rich coked solids are collected for disposal, possibly as feed for a cement kiln.

The equipment used includes a reactor comprising a rotating vessel housed in a heating chamber, means for feeding used oil into the rotating vessel, and an oil recovery system comprising a vapour extraction pipe, a solids removal cyclone, and vapour condensation equipment.

More particularly, the rotating vessel is indirectly heated so that its internal surfaces are sufficiently hot to vaporize and pyrolyse the feed oil. The feed oil is introduced into the vessel chamber wherein it vaporizes and pyrolyses, forming hydrocarbon vapour and coke. Metals and other contaminants become associated with the coke. A charge of coarse granular solids is provided within the vessel chamber. As the vessel rotates, the granular solids scour the vessel's internal surface and comminute the coke into fine solids. The fine solids may include solids introduced with the feed oil. The vapour is extracted from the vessel chamber through an axial pipe. The fine solids are separated within the vessel chamber from the coarse granular solids for removal from the vessel, preferably using a spiral chute. The chute spirals from a screened entrance at the vessel's circumference to a discharge outlet at the vessel's axis. The chute's screen excludes coarse solids and collects only the fine solids. The fine solids are conveyed out of the vessel for disposal. Fine solids may also be elutriated with the vapours. Any fine solids associated with the vapours are separated out. The substantially solids-free vapours are then condensed to yield product oil. The contaminant-rich fine solids are collected for disposal.

Only a small portion of the feed oil is converted to coke, the remainder being recovered as a substantially contaminant-free product oil.

In one embodiment, the invention is concerned with a thermal process for removing water, metal and halide contaminants from used oil comprising: providing a rotating vessel having a circumferential wall and end walls forming an internal reaction zone; providing a charge of non-ablating coarse granular solids which form a bed within the reaction zone; heating the outside of the vessel so as to indirectly heat the reaction zone and the bed of coarse granular solids by conduction through the vessel's walls; feeding contaminated used oil through one of the vessel's end walls so that it discharges into the reaction zone; vaporizing and pyrolyzing the oil within the heated reaction zone to produce hydrocarbon vapours and deposit coke, whereby contaminants become associated with the coke; scouring the vessel walls with the bed of coarse granular solids to remove coke deposits and comminute coke into fine solids; removing the hydrocarbon vapours and fine solids from the reaction zone; separating the fine solids and hydrocarbon vapours; and condensing the hydrocarbon vapours to recover substantially contaminant-free product oil.

DESCRIPTION OF THE PREFERRED EMBODIMENT

Figure 1:
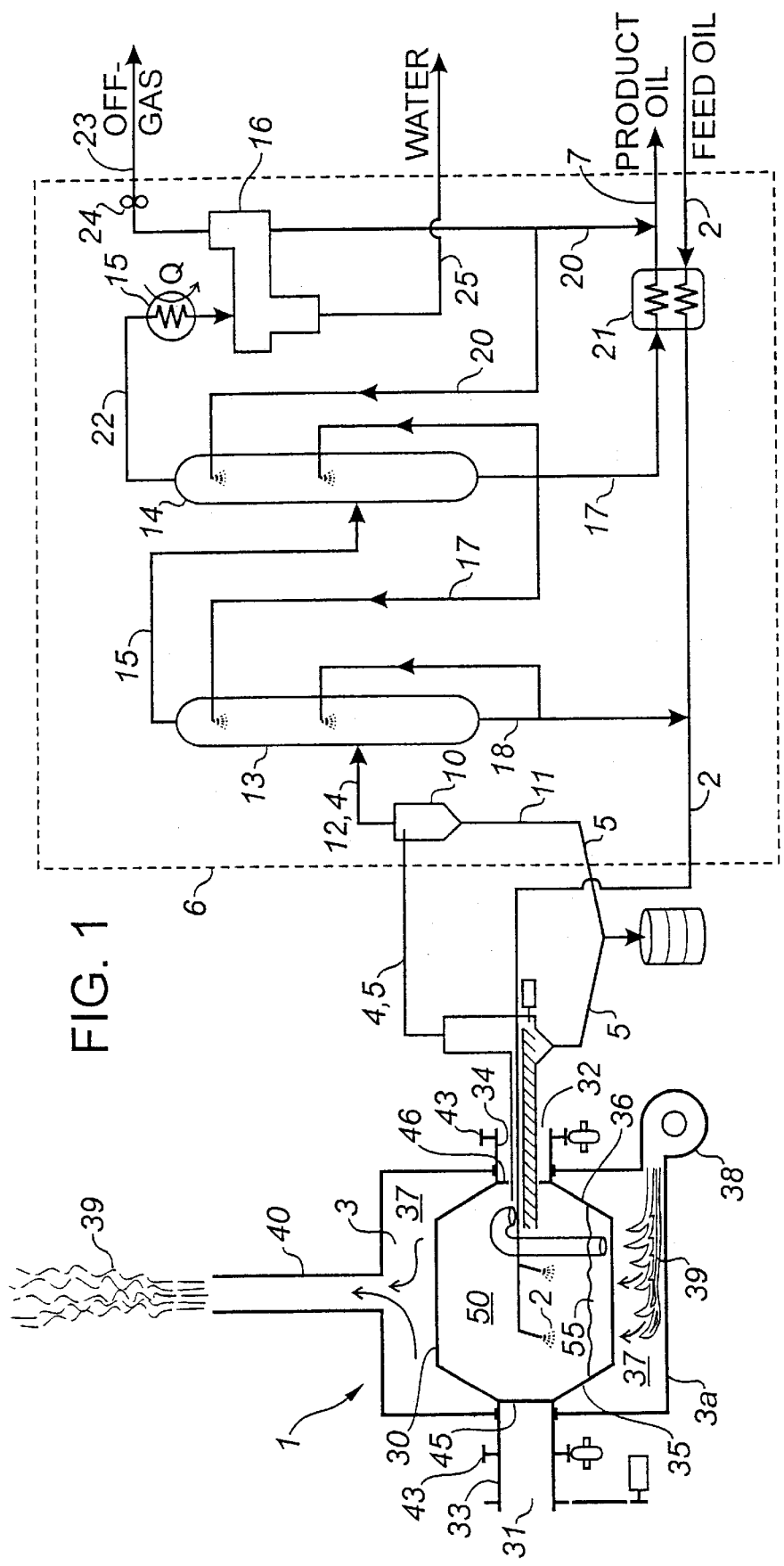
FIG. 1 is a schematic flow diagram of a contaminated oil thermal treatment reactor, heating chamber and hydrocarbon vapour condensation system according to one embodiment of the present invention.

Having reference to FIG. 1, the process is described in overview. A reactor 1 is provided for thermally treating used contaminated oil 2. The reactor 1 is housed within a heating chamber 3 formed by a housing 3a. Heat is generated in the chamber 3 to heat the reactor 1. Feed oil 2, contaminated with metals and one or both of water and solids, is fed to the reactor 1 for the separation of the contaminant from the oil component. Within the reactor 1: the feed oil is vaporized and pyrolysed, producing a hydrocarbon vapour stream 4, which may contain steam; coke 5 is formed as a byproduct; metals and solid contaminants become associated with the coke 5; and the coke 5 is separated from the hydrocarbon vapours 4. The hydrocarbon vapours 4 leave the chamber 3 and are conveyed to a vapour condensation system 6. Here the hydrocarbon vapour 4 are condensed as a substantially contaminant-free product oil 7, which is suitable to provide refinery feedstock. The coke 5 is removed from the reactor chamber 3 and is stockpiled or used as fuel.

In more detail, the vapour condensation system 6 comprises a cyclone 10 for stripping fine solids 11, including coke, from the hot reaction zone vapours 4. The stripped solids 11 are discharged for disposal. The stripped vapour 12 proceeds to a vapour scrubber tower ("scrubber") 13, a quench tower ("quencher") 14, a heat exchanger 15 and on into an overhead drum 16. In the scrubber 13, light oil reflux 17 from the quencher 14 and re-circulated scrubber oil 18 cause a heavy fraction of the hydrocarbon vapour 12 to condense (forming the scrubber oil 18), capturing any solids not removed by the cyclone 10. The heavy scrubber oil 18 is recycled to the reactor 1 by co-mingling it with the feed oil 2 before treatment. Un-condensed vapour 19 from the scrubber 13 is directed to the quencher tower 14 where light condensed oil 20 from the overhead drum and recycled quencher oil 17 are refluxed for condensation of the majority of the vapour 19. The quencher oil 17 is passed through a heat exchanger 21 for preheating the feed oil 2. Un-condensed vapour 22 is directed to the overhead drum 16 for the separation of water from the lightest fraction of the condensed oil 20 and from non-condensible off-gases 23. An off-gas compressor 24 provides the impetus necessary to draw vapour 4 from the reactor 1. Any separated water is discharged as a water product 25. The overhead drum oil 20 and quencher oil 17 are combined to form the product oil 7.

Figure 2:
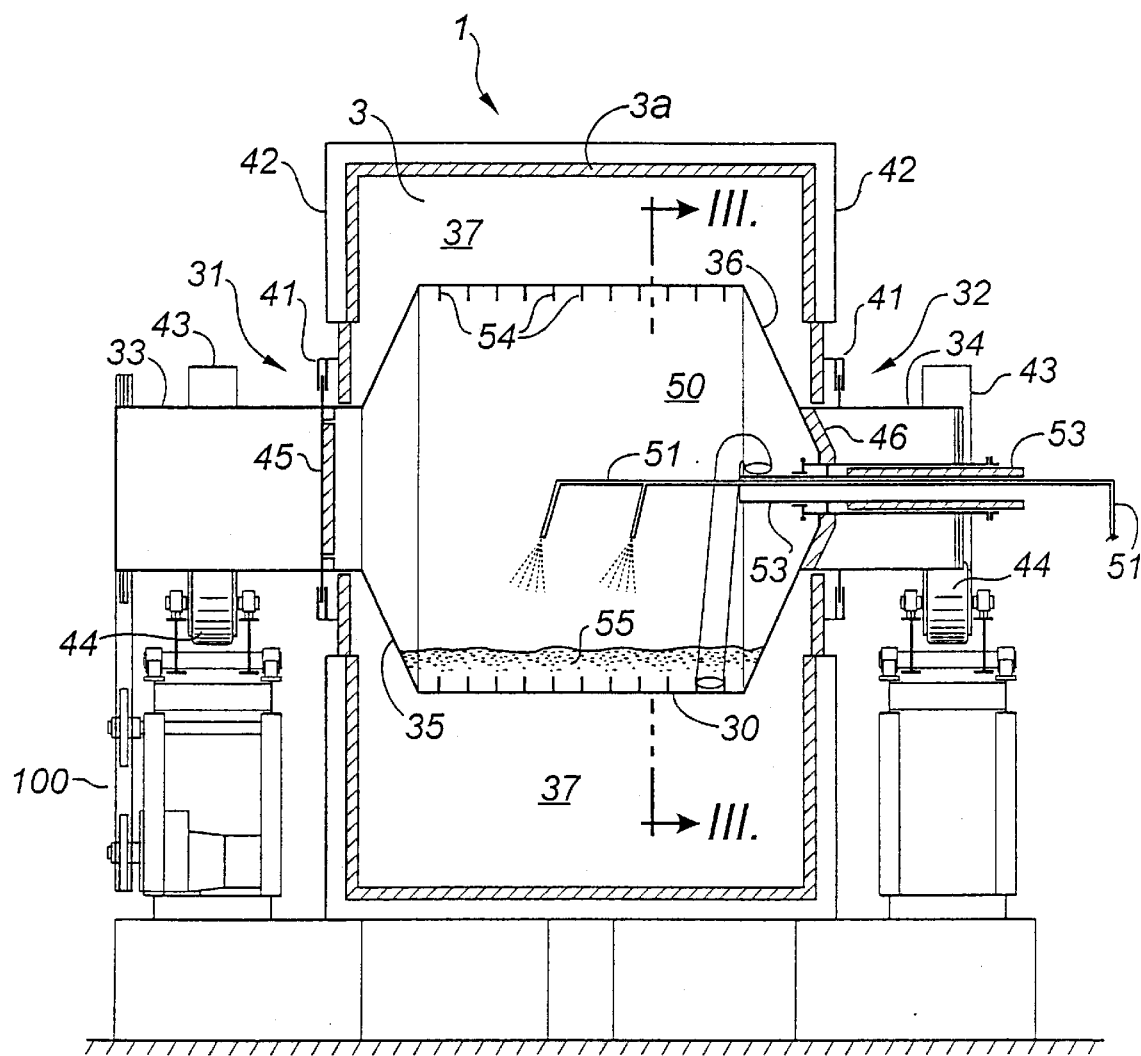
FIG. 2 is a cross-section of the heating chamber, reactor, rotary drive and support equipment according to the present invention.
Figure 3:
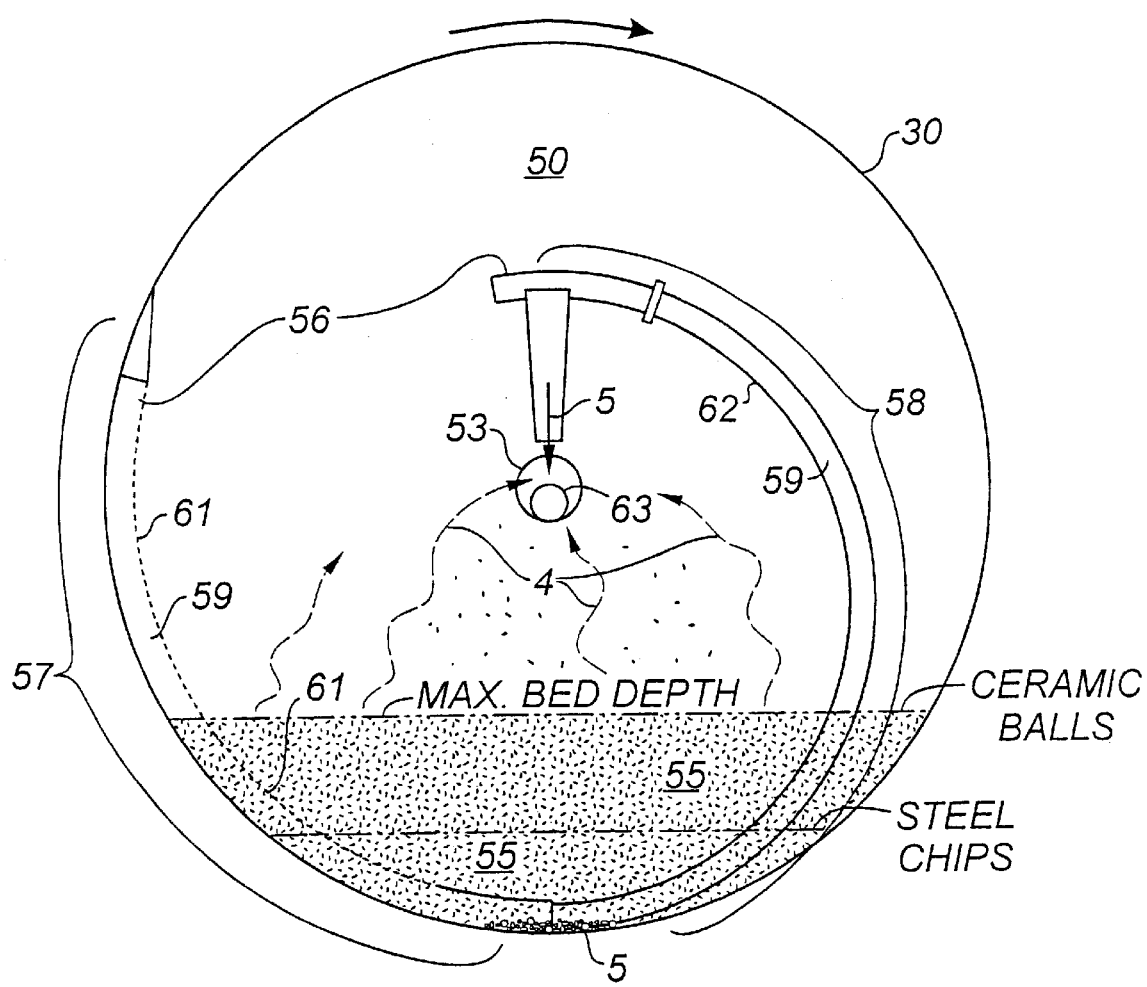
FIG. 3 is a cross-sectional view of the reactor vessel along line III—III of FIG. 2, showing in particular the fine solids removal chute.
Figure 4:
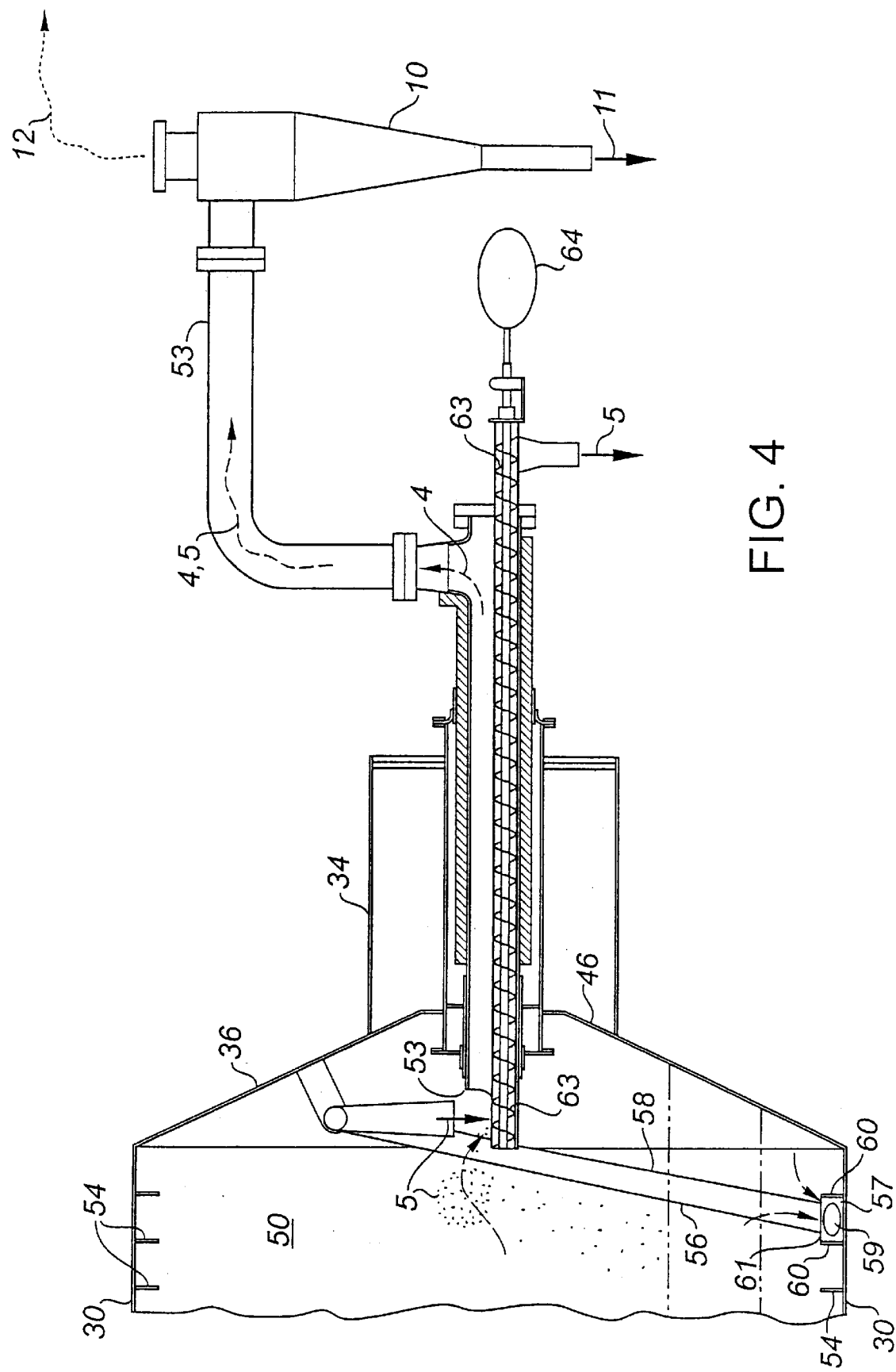
FIG. 4 is a partial cross-sectional view of the second end of the reactor vessel, featuring the fine solids removal chute and screw conveyor.

More specifically, and having reference to FIGS. 2 through 4, the reactor 1 comprises a cylindrical vessel 30 having a first end 31 and a second end 32. Cylinders 33,34 are structurally connected to the vessel 30 with conical transition sections 35,36 and extend axially from the first and second ends 31,32 respectively.

The vessel 30 is rotatably supported within the heating chamber 3. An annular space 37 is formed between the chamber housing 3a and the vessel 30.

Turning briefly back to the schematic shown in FIG. 1, burner 38 discharges heated combustion gas 39 for circulation through the annular space 37. A flue stack 40 at the top of the chamber 3 exhausts spend combustion gases 39.

The first and second end cylinders 33,34 extend through rotary seals 41 formed in the side walls 42 of the chamber housing 3. Riding rings 43 are mounted circumferentially to the cylinders 33,34, positioned outside of the chamber housing side walls 42. The riding rings and vessel are supported on rollers 44.

The inside of the vessel 30 is sealed at its first and second ends 31,32 by first and second panels 45,46 respectively forming a reaction zone 50.

A vapour pipe 53 extends through axis of the second panel 46. The vapour pipe 53 connects the reaction zone 50 and the condensation system 6. A feed oil line 51 extends through the second end panel 46. The line 51 distributes and discharges feed oil 2 in the reaction zone 50.

The vessel 30 contains internal heat transfer enhancing surfaces in the form of radially and inwardly extending rings or fins 54.

Having reference now to FIGS. 3 and 4, the reaction zone 50 is charged with coarse granular solids which are non-ablating and are permanently resident within the vessel 30. The coarse granular solids form a bed 55 in the bottom of the vessel chamber 50.

At the second end of the vessel 30 is a chute 56 for fines removal. The chute 56 has a circumferentially extending first portion 57 connected to a spiral second portion 58. The chute 56 forms a passageway 59 for the transport of fine solids to the vapour pipe 53. The chute extends opposite to the direction of rotation, from the first portion 57 to the second portion 58. Thus fine solids enter the first portion 57 of the chute 56 and advance through the second portion 58 as the vessel 30 rotates.

The chute's first portion 57 lies against the inside circumference of the vessel 30 and extends circumferentially for about 120°. The chute's first portion 57 comprises side walls 60 conveniently formed by adjacent fins 54, and a bottom formed by the wall of the vessel 30 at its outer radius. The inner radius or top of the first portion 57 is fitted with a screen 61. The screens openings 61 are small enough to exclude the coarse granular solids yet permit passage of finer solids.

The chute's second portion 58 is connected to the end of the first portion 57 and comprises a spiral pipe 62 which spirals inwardly from the vessel's circumference towards the vessel's centerline. The spiral pipe 62 rotates through about 180° to direct fine solids into the end of the vapour pipe 53. A screw conveyor 63 lies along the bottom of the vapour pipe 53 and extends therethrough to a point outside the heating chamber 3. A drive 64 rotates the screw conveyor 63.

Referring again to FIG. 1, in operation, the vessel 30 is rotated on its axis. Radiant and conductive heat from the burner's combustion gases 39 heat the annulus 37 and the walls of the vessel 30. The rotary seals 41 are cooled with a flow of combustion air (not shown).

Heat is indirectly transferred by conduction through the walls of the vessel 30 to the reaction zone 50. Heat is transferred from the vessel's walls and fins 54 to the granular solids to maintain their temperature at about 800–1300° F., which is sufficiently high so that feed oil is vaporized and pyrolized. Typically, the corresponding range of heating chamber temperatures required is about 1025–1450° F.

Contaminated oil 2 is fed through line 51 to the vessel 30. If liquid water is fed to the reaction zone 50, it will flash and can upset the sub-atmospheric pressure balance. Preheating the oil 2 via exchanger 21 vaporizes water to steam and aids in conservation of heat. Small amounts of water (say less than about 1 wt. %) present in the feed oil 2 may not require preheating.

As the vessel 30 rotates, the granular solids form a bed 55 which continuously brings bed's contents into contact with the vessel's walls 30 and fins 54, scouring the contacted surfaces. The granular solids absorb heat as they contact the vessel 30.

In a first embodiment, the feed oil 2 is directed to contact the reactor vessel cylindrical wall just before it rotates under the bed 55. The thermal mass of the vessel 30 provides sufficient heating load to substantially instantaneously vaporize and pyrolyse the oil. Hydrocarbon vapour 4 is produced and a solid coke byproduct 5 forms on the surfaces of the cylindrical walls of the vessel 30 and the fins 54.

Contaminants, such as metals and solids, remain substantially associated with the coke.

In a second embodiment, the oil is directed to contact the bed 55 which is maintained at pyrolysis temperatures through conductive heat transfer with the wall. The bed 55 is required to provide the thermal load to pyrolyse the oil. The wall of the vessel 30 is maintained at higher temperature than in the first embodiment as required to maintain sufficient temperature of the granular solids in the bed 55.

In both embodiments, the bed of granular solids scour the vessel walls and fins. The contaminant-rich coke and solids, which may have been associated with the feed oil, are scoured and thereby comminuted into fine solids which are free of the walls and the coarse granular solids.

Produced vapour 4 is extracted through the vapour pipe 53. The velocity of the vapour exiting the reactor vessel will elutriate some of the fine solids 5. The elutriated fine solids 5 exit the vapour pipe 53 and are passed through the cyclone 10 for separation of the solids 5 from the vapour stream 4.

As described above, the vapour stream 4 is passed through the condensation system 6, resulting in a liquid product 7 and a non-condensible off-gas stream 23. The liquid product 7 is sufficiently free of contaminants so as to be acceptable as a refinery feedstock. The off-gases 23 may be flared or be recycled to fuel the heating chamber burners 38.

The performance of the system is illustrated in the following example:

EXAMPLE I

A cylindrical reactor vessel 30, 10 feet in diameter and 8 feet in length, was constructed of ½" thick stainless steel. A plurality of 4" tall, ½" thick fins 54 were installed, at 8" spacings. Two 4 foot diameter cylinders formed the first and second ends 31, 32. A riding ring 43 was located on each cylindrical end and was rotatably supported on solid rubber rollers mounted on walking beams. A sprocket at the extreme outboard end of the first end cylinder and chain drive enabled rotation of the vessel.

The chute 56 comprised an 8" by 4" rectangular section first portion 57 and a 4" diameter pipe spiral second portion 58. The chute encompassed about 330° of rotation.

In a first test, the vessel was charged with 8500 pounds of inert ceramic balls available under the trade mark Denstone 2000, from Norton Chemical Process Products Corp, Akron, Ohio. As seen in FIG. 3, this produced a deep bed, the chord of which was about 120°. The vessel was rotated at 3 to 4 rpm. The feed oil was directed to be distributed along the rolling bed.

Two burners 38 provided about two million BTU/hr for maintaining the heating chamber 3 at about 1380° F. The resulting heat transfer through the vessel wall raised the temperature of the ceramic balls to about 805° F.

185 barrels per day of 28° API contaminated lube oil was preheated to 480° F. before discharging it into the reactor 1. The oil contained about 0.6% water. The reactor was maintained at a slight vacuum of −1 to −2 inches of water column.

Vapour was extracted from the reaction zone 50 and condensed to produce 175 bbl/day of 32° API product oil. The product oil was primarily quencher oil (95 to 98%) with a small contribution (2 to 5%) from the overhead drum oil. Vapour scrubber bottom oil was recycled to the reactor 1 at about 18.5 bbl/day (note that the solids fraction for this test was about 0.5% and is expected to be higher in other tests). The total production of non-condensible off-gases was 1912 kg/day. A further 147 kg/day of water was separated and produced from the condensation system.

Coke, containing contaminants, was produced at rates of 445 kg/day. In summary:

TABLE 1

| Feed Rate | 185 bbl/day | 28° API |
|---|---|---|
| Scrubber recycle | 18.5 bbl/day | (<0.5% solids) |
| Product oil | 175 bbl/day | 32° API |
| off-gas | 1912 kg/day | |
| water | 147 kg/day | |
| coke | 445 kg/day | |

An analysis of the feed oil and the product oil confirmed a 99.84% removal of metals. This was achieved with only a 5.4% reduction in the original volume of feed oil, demonstrating little degradation of the feed oil. The resulting oil was slightly lighter product, having reduced its gravity from 28 to 32 API. Total halides were also reduced by 80%. A more detailed analysis is shown in Table 2.

TABLE 2

| Parameter | Feed Oil ug/g | Quencher Oil ug/g | Scrubber Oil ug/g | Coke ug/g |
|---|---|---|---|---|
| Aluminum | 9.4 | 0 | 4.1 | 1100 |
| Barium | 5.6 | 0 | 2.1 | 230 |
| Beryllium | 0 | 0 | 0 | 0 |
| Calcium | 870 | 0 | 95 | 51700 |
| Cadmium | 0.7 | 0 | 0.2 | 41 |
| Cobalt | 0.04 | 0 | 0.04 | 26 |
| Chromium | 1.8 | 0 | 0.29 | 130 |
| Copper | 46 | 0.02 | 5.7 | 2400 |
| Iron | 120 | 0.12 | 21 | 8400 |
| Lead | 61 | 0 | 27 | 3000 |

TABLE 2-continued

| Parameter | Feed Oil ug/g | Quencher Oil ug/g | Scrubber Oil ug/g | Coke ug/g |
|---|---|---|---|---|
| Magnesium | 390 | 0 | 45 | 23700 |
| Manganese | 68 | 0.02 | 8.8 | 4000 |
| Molybdenum | 12 | 0 | 1.5 | 720 |
| Nickel | 0.95 | 0 | 0.34 | 110 |
| Potassium | 130 | 0 | 14 | 4000 |
| Silver | 0 | 0 | 0 | 0 |
| Sodium | 380 | 1.9 | 51 | 21000 |
| Strontium | 1.6 | 0 | 0.23 | 97 |
| Titanium | 0.72 | 0 | 0.32 | 69 |
| Vanadium | 0 | 0 | 0 | 0 |
| Zinc | 880 | 0.27 | 170 | 51400 |
| Zirconium | 0.02 | 0 | 0 | 3 |
| Boron | 11 | 1.1 | 0.78 | 130 |
| Phosphorus | 820 | 2.8 | 160 | 50800 |
| Total Metals | 3808.8 | 6.2 | | |
| Halides | 490 | 98.5 | | |

Assuming no metals reported to the overhead oil, the reduction of metals from the feed oil to the product oil was determined to be (3808.8−6.2)/3808.8=99.8%. The metals reported substantially to the coke.

The reduction in halides was found to be (490−98.5)/490= 80%.

The ceramic balls were not entirely successful in scouring all of the coke from the reactor vessel walls. Thus, most of the fine coke was produced via elutriation and not through the spiral chute whose screen became blinded by coke accumulation.

EXAMPLE II

In a second test run performed on the same equipment, the ceramic balls were replaced with a charge of cylindrical, 1 to 2" diameter, ½" thick spring steel punchings or chips. Also shown in FIG. 3, about 3300 pounds of chips formed a shallow bed level in the vessel having a bed chord angle of about 75°.

The feed oil was directed to impinge directly upon the reactor vessel wall. The thermal load to vaporize the oil was provided by the wall itself and not the steel chips. Thus, the wall did not need to conduct a large amount of heat to the chips through conduction and the wall temperature was correspondingly lower.

The steel chips successfully scoured coke from the vessel walls, sufficient to prevent blinding of the chute's screen and permit sustainable extraction of fine coke from the reaction zone as it was produced.

A comparison of the process temperature conditions in both the ceramic ball and steel chip runs are as follows, presented in Table 3 (rounded to the nearest 5° F.).

TABLE 3

| | (° F.) | |
|---|---|---|
| | Balls EXAMPLE I | Chips EXAMPLE II |
| Reactor Bed | 805 | 840 |
| Reactor Vessel Wall | 1290 | 930 |
| Heating Chamber | 1380 | 1020 |
| Feed Oil | 480 | 480 |
| Vapour Scrubber | 700 | 700 |
| Quencher | 465 | 465 |
| Overhead Drum | 85 | 85 |

The above process embodies the following advantages:

it is a continuous process with continuous removal of coke containing contaminants;

removal of contaminants is achieved with minimal degradation of the feed oil;

there is a minimal requirement for materials handling equipment, comprising only of a rotating vessel, a screw conveyor and a cyclone;

avoiding the use of consumables; and simplicity of operation.

The embodiments of the invention in which an exclusive property or privilege is claimed are defined as follows:

1. A thermal process for removing water, metal and halide contaminants from used oil comprising:

providing a rotating vessel having a circumferential wall and end walls forming an internal reaction zone;

providing a charge of non-ablating coarse granular solids which form a bed within the reaction zone;

heating the outside of the vessel so as to indirectly heat the reaction zone and the bed of coarse granular solids by conduction through the vessel's walls;

feeding contaminated used oil through one of the vessel's end walls so that it discharges into the reaction zone;

vaporizing and pyrolyzing the oil within the heated reaction zone to produce hydrocarbon vapours and deposit coke, whereby contaminants become associated with the coke;

scouring the vessel walls with the bed of coarse granular solids to remove coke deposits and comminute coke into fine solids;

removing the hydrocarbon vapours and fine solids from the reaction zone;

separating the fine solids and hydrocarbon vapours; and condensing the hydrocarbon vapours to recover substantially contaminant-free product oil.

2. The thermal process as recited in claim 1 wherein fine solids are removed from the reaction zone by elutriation with the hydrocarbon vapours.

3. The thermal process as recited in claim 1 wherein the fine solids are removed from the reaction zone by a combination of:

elutriation of fine solids with the hydrocarbon vapours, and mechanically separating fine solids from the bed of coarse solids and conveying the fine solids out of the reaction zone.

4. The thermal process as recited in claim 1 wherein the feed oil is discharged so as to contact the circumferential vessel wall.

5. The thermal process as recited in claim 1 wherein the feed oil is discharged so as to contact the bed of coarse solids.

6. The thermal process as recited in claim 2 wherein the feed oil is preheated, to a temperature sufficient to vaporize water, prior to discharge into the reaction zone.

7. The thermal process as recited in claim 2 wherein the coarse solids are a plurality of steel chips.

8. The thermal process as recited in claim 5, wherein the coarse solids comprise a plurality of steel chips.

9. The thermal process as recited in claim 6, wherein the coarse solids comprise a plurality of steel chips.

10. The thermal process as set forth in claim 2 wherein the granular solids are heated to a temperature in the range 800 to 1300° F.

11. The thermal process as set forth in claim 3 wherein the granular solids are heated to a temperature in the range 800 to 1300° F.

* * * * *